United States Patent
Wu et al.

(10) Patent No.: US 7,433,283 B2
(45) Date of Patent: Oct. 7, 2008

(54) HYBRID SWITCHING METHOD OF SPINDLE MOTOR OF OPTICAL DISC DRIVE

(75) Inventors: Jan-Tang Wu, Taipei (TW); Wei-Chung Wu, Taipei (TW)

(73) Assignee: Mediatek Incorporation (TW)

( * ) Notice: Subject to any disclaimer, the term of this patent is extended or adjusted under 35 U.S.C. 154(b) by 565 days.

(21) Appl. No.: 10/971,012

(22) Filed: Oct. 25, 2004

(65) Prior Publication Data

US 2005/0265178 A1 Dec. 1, 2005

(30) Foreign Application Priority Data

May 25, 2004 (TW) .............................. 93114842 A (51) Int. Cl.
*G11B 7/00* (2006.01)
(52) U.S. Cl. .................................. 369/47.41; 369/53.37
(58) Field of Classification Search .............. 369/47.36, 369/47.1, 53.1

See application file for complete search history.

(56) References Cited

U.S. PATENT DOCUMENTS

| 7,035,179 B2 * | 4/2006 | Chen et al. ............... 369/47.11 |
| 7,215,614 B2 * | 5/2007 | Fu et al. ................... 369/47.33 |
| 7,230,891 B2 * | 6/2007 | Hagiwara ................ 369/47.11 |
| 2002/0003761 A1 | 1/2002 | Jin |
| 2005/0265194 A1 * | 12/2005 | Wu ......................... 369/53.25 |

* cited by examiner

*Primary Examiner*—Wayne Young
*Assistant Examiner*—Van T Pham
(74) *Attorney, Agent, or Firm*—Birch, Stewart, Kolasch & Birch, LLP (57) ABSTRACT

A hybrid switching method of spindle motor of optical disc drive analyze a disc position status for write/read in said optical disc drive, according said optical disc drive speed to detect a switch mode, and determine said optical disc drive of write/read mode to got a switch point.

17 Claims, 6 Drawing Sheets

HYBRID SWITCHING METHOD OF SPINDLE MOTOR OF OPTICAL DISC DRIVE

This Nonprovisional application claims priority under 35 U.S.C. § 119(a) on patent application No(s). 093114842 filed in Taiwan, Republic of China on May 25, 2004, the entire contents of which are hereby incorporated by reference.

BACKGROUND OF THE INVENTION

1. Field of the Invention

The present invention relates to a hybrid switching method of spindle motor of optical disc drive and, more particularly, to a hybrid switch method for use a feedback RF signal of the disc of a spindle motor of an optical disc drive.

2. Description of Related Art

A disc data track is distributed of the spiral-shaped track. Every unit data is the same distant from inner to outer method to record on the disc. So, the every cycle disc data quality is directly proportional with the disc radius. According to the present spindle motor control method have two kind of the write/read mode, one is Constant Linear Velocity (CLV) and another is Constant Angular Velocity (CAV).

Figure 1A:
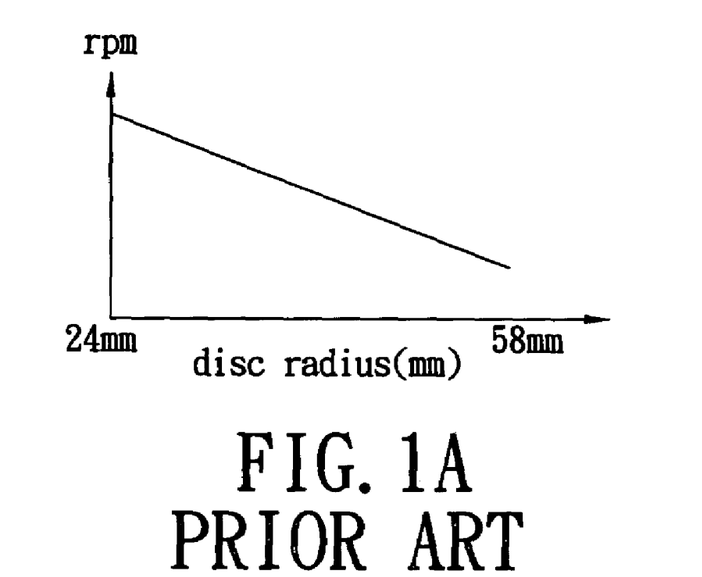
FIG. 1a is a spindle motor rotate speed and position relationship on the CLV mode of the prior art.
Figure 1B:
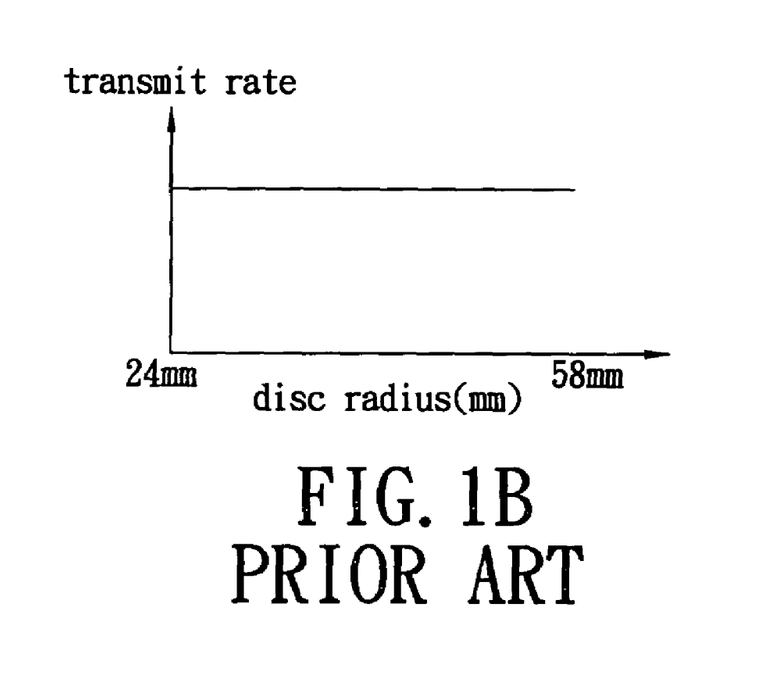
FIG. 1b is a data transmit rate and position relationship on the CLV mode of the prior art.

In tradition CLV control method mode and fix transmit rate, the rotate speed is inversely proportional with disc radius. FIG. 1a shows a spindle motor speed and position relationship on the CLV mode. And FIG. 1b shows a data transmit rate and position relationship on the CLV mode. The CLV transmit mode was limited to easy by motor speed. To use the CLV method, will need to high rotate speed motor to prove data transmit rate and create cost up. Meanwhile, the motor rotate speed is maximum in the CLV mode and creates the motor power lose biggest. These questions will more severity on the high optical disc drive, especially.

Figure 2A:
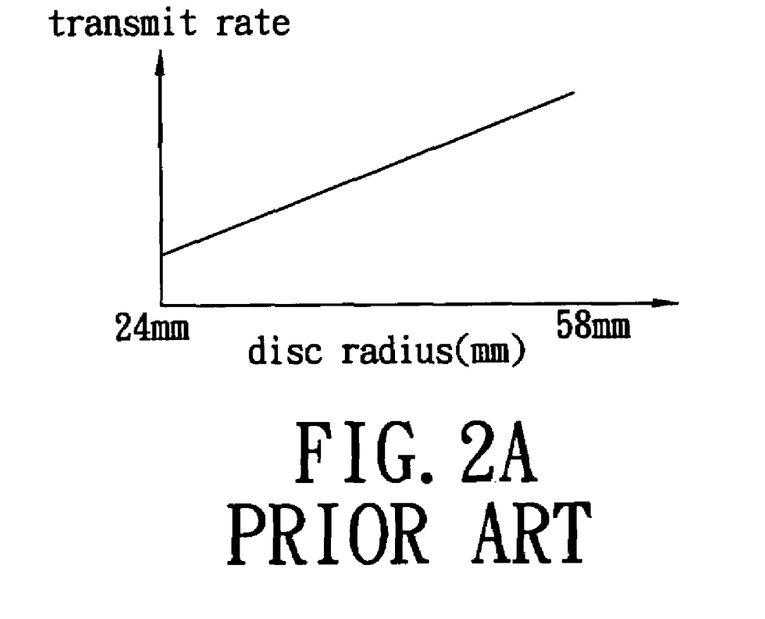
FIG. 2a is a data transmit rate and position relationship on the CAV mode of the prior art.
Figure 2B:
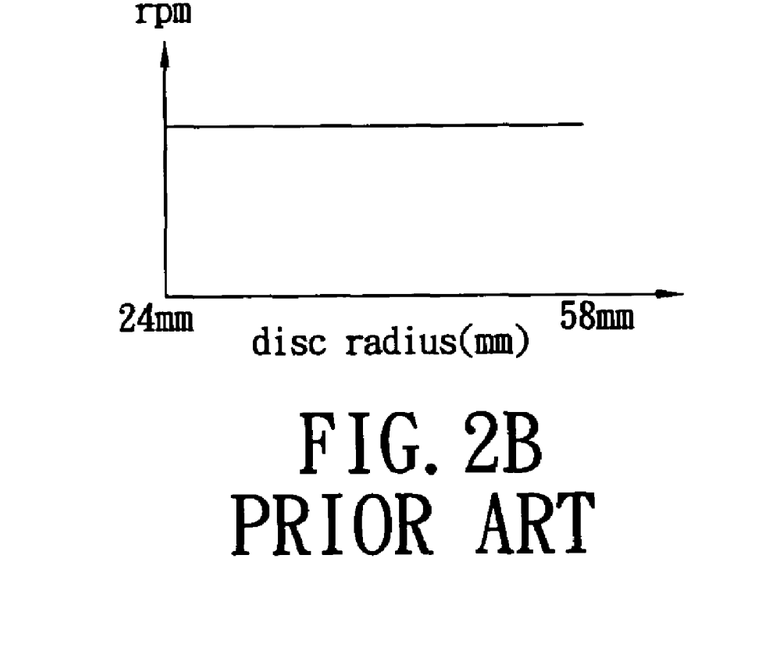
FIG. 2b is a spindle motor rotate speed and position relationship on the CAV mode of the prior art.

In tradition CAV control method mode and fix rotate speed, the transmit rate is directly proportional with disc radius. FIG. 2a shows data rate and position relationship on the CAV mode. And FIG. 2b shows a spindle motor speed and position relationship on the CAV mode. Use the CAV mode control motor will meet to data quality follow pick-up head position to change question. When the CAV in the outside, the transmit rate will faster. But, when the CAV in the inside, the transmit rate will slower.

In conclusion, according to prior method will have below disadvantage:

(1) Only the CLV write/read method, the inner/outside motor speed is not the same. To create high motor power lose and to long search track time. The data transmit rate will be limit to lower for inner motor rotate speed.

(2) Only the CAV write/read method, the motor rotate speed is a fixed value. So, the motor power lose is lower and search track time is shorter. But, the data transmit rate is directly proportional with the disc radius. Consequently, the average data transmit rate will be limit to lower by outside data transmit rate.

SUMMARY AND OBJECTS OF THE PRESENT INVENTION

The primary object of the present invention is to provide a hybrid switching method of spindle motor of optical disc drive.

To achieve the above object, the present invention provides a hybrid switching method of spindle motor of optical disc drive comprising the steps of: analyzing a disc position status for write/read in said optical disc drive, according said optical disc drive speed to detect a switch mode, and determining said optical disc drive of write/read mode to got a switch point.

BRIEF DESCRIPTION OF DRAWINGS

The various objects and advantages of the present invention will be more readily understood from the following detailed description when read in conjunction with the appended drawings, in which.

DETAILED DESCRIPTION OF PREFERRED EMBODIMENTS

It is important to set a good initial speed when an optical disc drive starts reading or writing. A good initial speed will affect the jitter error that is one factor relative to the read/write quality. A good initial speed inside the disc can not ensure the speed outside the disc meeting the requirement (generally the outside speed is called maximum speed), simultaneously. The present invention provides a spindle mix mode control technology which applies CAV (Constant Angular Velocity) mode on the inside of the disc and switches to apply CALV (Constant Angular Linear Velocity) mode on the outside of the disc. Therefore it is called hybrid switch control mode. Please refer to FIG. 3 which illustrates an integration architecture graph of a hybrid switch control of a spindle motor of an optical disc drive of the present invention. When pick-up head moves from inside to outside, a first switch point 14 (SYNC_DIV_MAX) distributes the write/read mode of the optical disc drive into CAV 10 and CALV 12. The angular velocity is fixed and the data transmit rate rises up linearly by use of CAV 10 mode on the inside. The data transmit rate is fixed and the angular velocity falls by use of CALV 12 mode on the outside.

Figure 3:
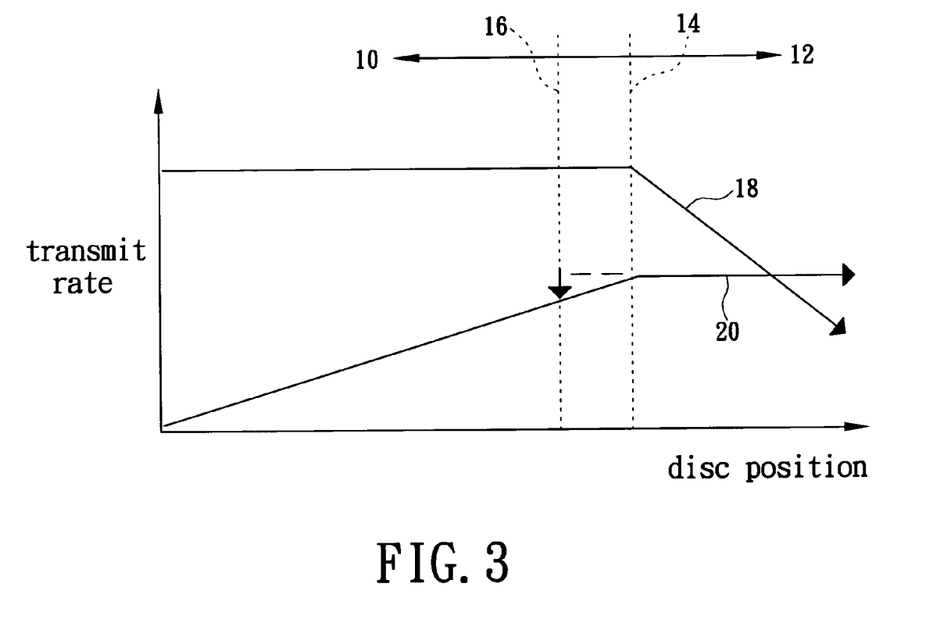
FIG. 3 is an integration architecture graph of a hybrid switch control of a spindle motor of an optical disc drive of the present invention.

When the pick-up head moves from outside to inside, the switch point changes to a second switch point 16 (SYNC_DIV_MIN) for switching from CALV mode to CAV mode. The switch points are different in order to avoid signal noises caused by switching at the same point too frequently, so to make the unwanted delay effect. The rotate speed curve 18 illustrates that CAV mode is applied to read disc on the inside, and CALV mode is applied to read disc on the outside. The data transmit rate curve 20 illustrates that CAV mode is applied to write disc on the inside such that the data rate rises up and CALV mode is applied to write disc on the outside.

Figure 4:
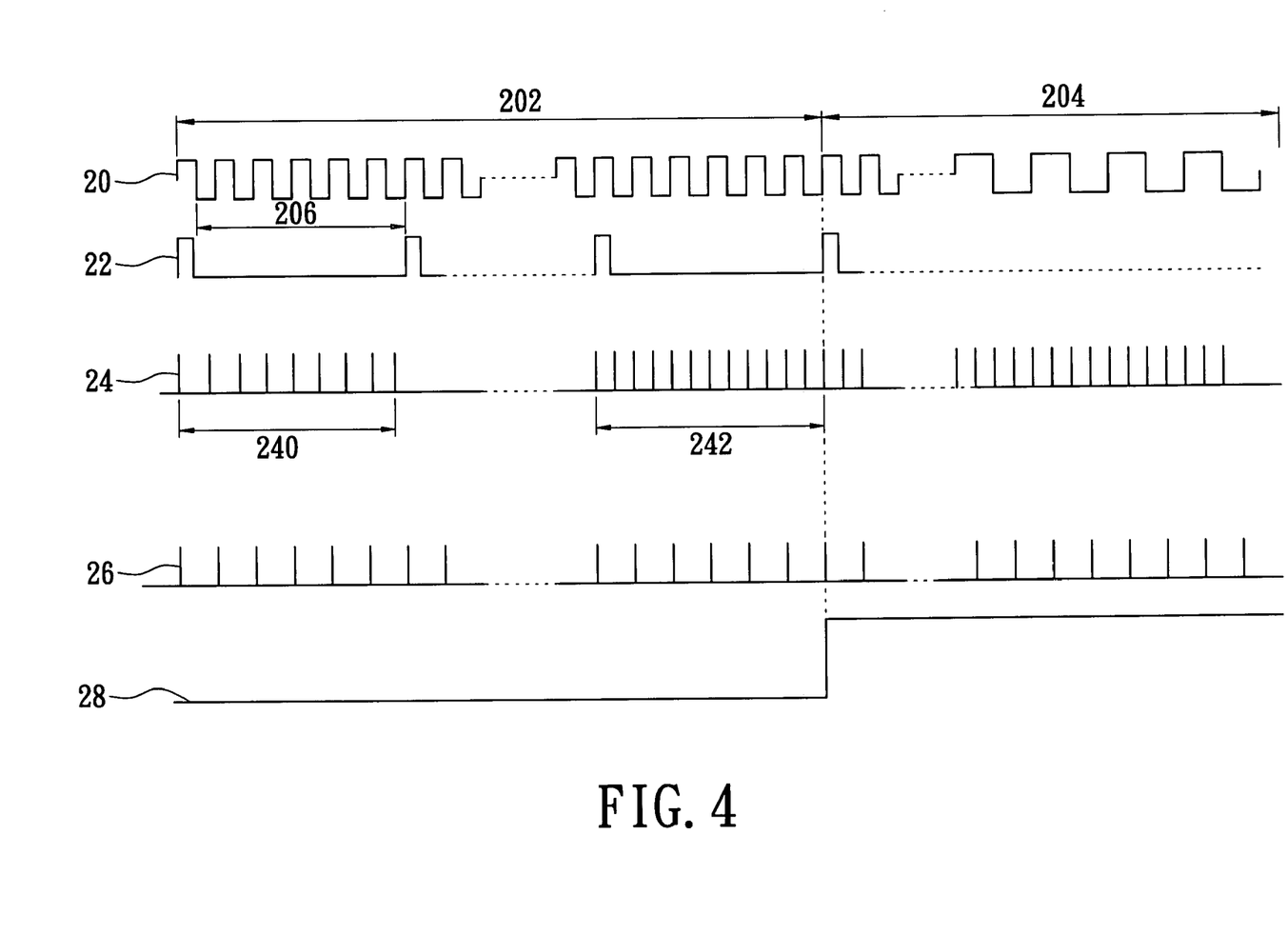
FIG. 4 is a signal waveform graph of the present invention.

FIG. 4 is an integration architecture graph of a hybrid switch control of a spindle motor of an optical disc drive of the present invention. A waveform FG 20 is motor feedback signal. A waveform 202 is CAV mode in inside and a waveform 204 is CALV mode in outside. A waveform one_revolution 22 is a signal of the motor rotate one cycle. The motor feedback signal (FG) is according to port number of the motor. Example if the motor ports number is six then the motor rotate one cycle will have six motor feedback signal (FG) pluses 206. So have six motor feedback signal (FG) pluses 206 between two one_revolution 22 signals. The present invention will accord the motor feedback signal numbers to adjudge the motor rotate one cycle. The present invention is use CAV mode to write/read inside and is use CALV mode to write/read outside. A waveform sync_n 24 is eight to fourteen modulation sync (EFM sync) or is fsck signal (through a reflection signal from wobble of the disc). The EFM sync also is a frequently of data signal synchronization.

The waveform sync_n 24 is more faster to near outside when use CAV mode to read inside. The sync_n 24 is a signal of the synchronization frequently. The synchronization frequently signal 24 will to near a constant number when use CALV mode on outside. The CAV mode is control motor feedback signal 20 speed. Because the synchronization frequently signal value is more less than a first switch point (sync_div_max) value on inside, so the synchronization frequently signal 24 width is more width (show as a first width waveform 240). Because the synchronization frequently signal value is more large or equal to the first switch point (sync_div_max) value to near outside, so the synchronization frequently signal 24 width is more narrow (show as a second width waveform 242). The present invention is use CALV mode after over the switch point and the CALv mode is control synchronization signal of the disc (CD_SYNC) speed.

According to the synchronization number value of a rotate disc determine over switch point of the pick-up head speed in outside. A waveform cav_sync 26 is a basis signal for switch control wherein said cav_sync is CAV synchronization signal. The CAV part to appear is a basis rising pulse of the motor feedback signal 20. A CALV enable signal 28 (calv_en) is look for over the first switch point value. The CALV enable signal will to count the amount of said first switch point. When over the synchronization number of a rotate disc, said first switch point would to enable.

The present invention could convert motor feedback signal 20 before switch point and equivalent to several CD_SYNC signal of the disc. When over the switch point, the motor feedback signal 20 from input will change to synchronization signal of disc. That is not making discontinuous of speed in switch. The control is EFM sync signal not synchronization signal of motor feedback. This representation is spindle motor control mode from CAV switch to CALV switch. The present invention use CALV switch speed to keep for write/read speed which according the synchronization number value of a rotate disc to determine the switch speed for change to CALV on outside. The synchronization number value is make for motor feedback signal frequently divide by EFM sync signal frequently and to avoid the discontinuous speed for switch. That is getting the smooth of write/read speed.

The CALV switch mode is a specific case for CAV mode. The source input is original motor feedback signal 20 on inside and switch to a CD_SYNC divided by SYNC_DIV on outside. Wherein said CD_SYNC is EFM sync frequently or PLCK/588 and next write is change to Fsck/6.

The switch point determine are two kinds between for CAV and CALV switch. One is according to pick-up head position and another is according to disc speed.

(1) By Radial Position:

The radial position is use position as a switch basis. The current pick-up head of disc position is estimate for a period of the motor feedback of the synchronization amount. The calculate formula below as:

$$\text{SYNC\_DIV} = \frac{T_{FG}}{T_{SYNC}} = \frac{F_{SYNC} \times 2\pi R}{v \times \text{pole}} = \frac{R}{v \times \text{pole}} \times N \quad (1)$$

$$\text{SYNC\_DIV\_MAX(MIN)} = \frac{T_{rev}}{T_{sync}} = \frac{F_{sync} \times 2\pi R}{v} = \text{SYNC\_DIV} \times \text{pole} \quad (2)$$

In formula (2), the SYNC_DIV_MAX is said first switch point. The SYNC_DIV_MIN is said second switch point. The Fsync is eight to fourteen modulation sync (EFM sync) and is a sync frequency of the disc data signal; wherein said Fsync is 7.35K for CD and is 17.6K for DVD. The Trev is rotate a disc cycle time. The Tsync is reciprocal Fsync. The v is a line speed in the one multiple of the disc; wherein said v is 1.2~1.4 m/s for CD and is 3.46~3.87 m/s for DVD. The R is radius of disc. The pole is Hall sensor quantity of said motor. The SYNC_DIV is sync quantity of rotate a disc cycle.

In formula (1), the Tfg is motor feedback signal period of the disc. The Tsync is reciprocal Fsync. The Fsync is eight to fourteen modulation sync (EFM sync) and is a sync frequency of the disc data signal; wherein said Fsync is 7.35K for CD and is 17.6K for DVD. The v is a line speed in the one multiple of the disc; wherein said v is 1.2~1.4 m/s for CD and is 3.46~3.87 m/s for DVD. The R is radius of disc. The pole is Hall sensor quantity of said motor. The N is a number and said number is 46181 for CD and is 110584 for DVD.

The motor rotate speed control is switch from CAV mode to CALV mode, when a rotate disc of synchronization amount is large than said first switch point and the pick-up head from inside to outside. For formula (2) could get said first switch point to determine the synchronization amount of a rotate disc. The synchronization amount of a rotate disc is determined by formula (1). The switch position is only determined by radius R in formula (1). The switch point is dependent with pick-up head position and independent with optical disc drive multiple.

(2) By Linear Velocity:

Another detect method is calculate sync amount in a section times. The rotate speed is fixed in CAV mode when the data transmit rate more faster in outside. The method is use data transmit rate as adjudge pointer and the formula below as:

$$\text{SYNC\_DIV} = \frac{T_{target}}{T_{sync}} = \frac{(\text{Target value})/(\text{fg\_clk})}{(F_{sync} * spd)^{-1}} \quad (3)$$

$$\text{SYNC\_DIV\_MAX(MIN)} = \quad (4)$$
$$\frac{T_{fix\text{-}interval}}{T_{sync}} = \frac{(2.0625 \text{ k}/\text{Interval})^{-1}}{F_{sync}^{-1}} = 3.5636 * spd * \text{Interval}$$

In formula (4), the SYNC_DIV MAX is said first switch point, the SYNC_DIV_MIN is said second switch point. The Tfix-internal is a length of fix-time for user defines. The Fsync is eight to fourteen modulation sync (EFM sync) and is a sync frequency of the disc data signal. The Trev is rotating a disc cycle time, and the Tsync is reciprocal Fsync. The Interval is length of the detected time (sampling rate cycle is 496 ms). The spd is target rotate speed for over switch point.

In formula (3), the Target is disc target; the fg_clk is FG signal counting clock of the disc. The Target value is quality of the feedback signal period disc. The Target value is calculating method show as table 1. The Fsync is eight to fourteen modulation sync (EFM sync) and is a sync frequency of the disc data signal, the Trev is rotate a disc cycle time. The Tsync is reciprocal Fsync. The fg_clk is feedback signal of the motor, the calculate method of the feedback signal clock motor as 7.1615 Khz*speed*pole for optical disc drive 1, 2, 4, 8, 16 or 32× speed, the calculate method of the feedback signal clock motor as 6.3657 Khz*speed*pole for optical disc drive 12 or 24× speed. The spd is target rotate speed for over switch point; wherein said speed is write/read speed of optical disc drive. The pole is Hall sensor amount of the motor.

TABLE 1

| Optical disc drive speed | Target value | | | |
| --- | --- | --- | --- | --- |
| | CALV | | CAV | |
| | Disc | DVD | CD | DVD |
| 1× | 2244 | 1877 | 1385 | 1031 |
| 2× | | | 1385 | 1031 |
| 4× | | | 1385 | 1031 |
| 8× | | | 1385 | 1031 |
| 10.1× | | | 1462 | 1089 |
| 12× | | | 1230 | 917 |
| 16× | | | 1385 | 1031 |
| 24× | | | 1230 | 917 |
| 32× | | | 1385 | 1031 |

The method is getting several synchronization amount in fix time to determine current data transmit rate. To set the rotate speed optical disc drive is CAV 32× speed (data transmit rate is 20~48× speed) and switch to CALV mode in data transmit rate 40× speed. The optical disc drive will use CAV 32× speed to rotate and the optical drive will keep in 40× speed transmit rate when data transmit rate until 40× speed.

Figure 5:
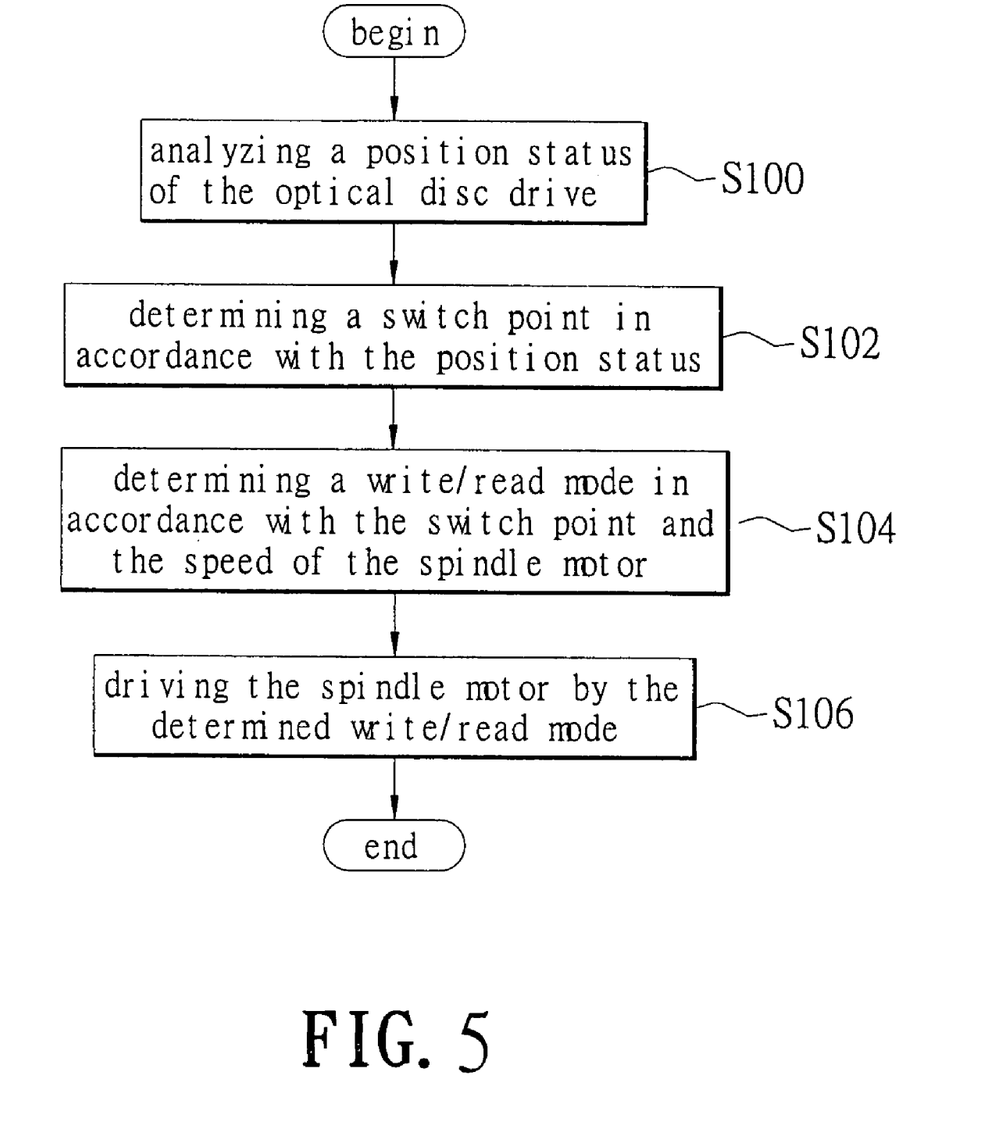
FIG. 5 is a flowchart of a hybrid switch control of a spindle motor of an optical disc drive of the present invention.

FIG. 5 is a flowchart of a hybrid switiching method of a spindle motor of an optical disc drive of the present invention. The first step of the method is to analyze a position status of the optical disc drive, wherein the position status is from inside to outside or from outside to inside (S100). After analyzing the position status of the disc drive, according to the position status of the optical disc drive, a switch point is determined from the first switch point and the second switch point (S102), wherein on the switch point, the write/read mode used for driving the spindle motor of optical disc drive is switched. According to the switch point to the speed of the spindle motor, a control mode for driving the optical disc drive is determined (S104), wherein the write/read mode is CALV (Constant Angular Linear Velocity) mode or CAV (Constant Angular Velocity) mode. Following, the spindle motor of the optical disc drive is driven by the determined write/read mode (S106).

Figure 6:
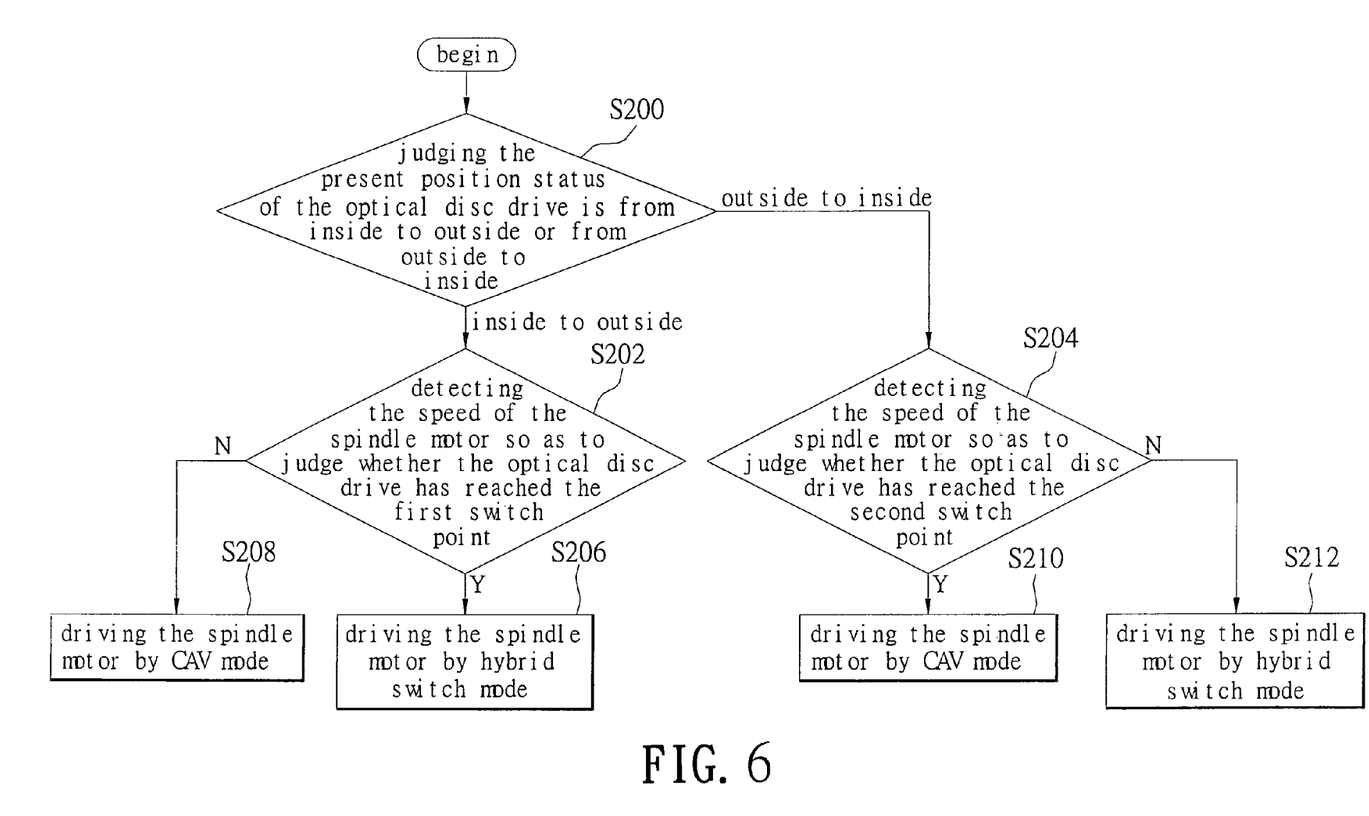
FIG. 6 is a flowchart of a hybrid switch control of a spindle motor of an optical disc drive according to a preferred embodiment of the present invention.

FIG. 6 is a flowchart of a hybrid switching method of a spindle motor of an optical disc drive according to a preferred embodiment of the present invention. The first step of the method is to judge the present position status of the optical disc drive is from inside to outside or from outside to inside (S200). If the result of the step S200 is from inside to outside, the speed of the spindle motor is detected so as to judge whether a motion of the optical disc drive has reached the first switch point (S202). If the result of the step S202 is yes, the spindle motor of the optical disc drive is driven by the hybrid switch mode (S206).

If the result of the step S200 is from outside to inside, the speed of the spindle motor is detected so as to judge whether the motion of the optical disc drive has reached the second switch point (S204). If the result of the step S204 is yes, the spindle motor of the optical disc drive is driven by CAV mode (S210). If the result of the step S204 is no, the spindle motor is driven by the hybrid switch write/read mode (S212). If the result of the step S202 is no, the spindle motor is driven by CAV mode (S208).

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A hybrid switching method of a spindle motor of an optical disc drive, comprising the steps of:
   providing a first switch point and a second switch point for switching said spindle motor driven selectively by two different write/read modes, wherein the first switch point and the second switch point are separated;
   analyzing a position status of said optical disc drive;
   wherein the disc position status of said optical disc drive is from inside to outside or from outside to inside;
   according to the position status of said optical disc drive determining a switch point from the first switch point and the second switch point; and
   determining a write/read mode from said two write/read modes in accordance with the determined switch point;
   wherein while the position status is from inside to outside, the first switch point is determined.

2. The hybrid switching method of a spindle motor of an optical disc drive as claimed in claim 1, wherein said two write/read modes comprises CALV (Constant Angular Linear Velocity) mode.

3. The hybrid switching method of a spindle motor of an optical disc drive as claimed in claim 1, wherein said two write/read modes comprises CAV (Constant Angular Velocity) mode.

4. The hybrid switching method of a spindle motor of an optical disc drive as claimed in claim 1, wherein after said step of determining a write/read mode from said two write/read modes, the method further comprises the step of driving said spindle motor by the determined write/read mode.

5. The hybrid switching method of a spindle motor of an optical disc drive as claimed in claim 1, further comprising the step of detecting the speed of said spindle motor.

6. A hybrid switching method of a spindle motor of an optical disc drive, comprising the steps of:
   providing a first switch point and a second switch point, wherein the first switch point and the second switch point are separated;
   judging a present position status of said optical disc drive is from inside to outside or from outside to inside;
   if the present position status is from inside to outside, detecting the speed of said spindle motor so as to judge whether said optical disc drive has reached the first switch point; and
   if said optical disc drive has reached the first switch point, driving said spindle motor by a hybrid switch mode.

7. The hybrid switching method of a spindle motor of an optical disc drive as claimed in claim 6, wherein if the result of the step of judging the present position status of said optical disc drive is from outside to inside, the method further comprises the step of detecting the speed of said spindle motor so as to judge whether said optical disc drive has reached the second switch point.

8. The hybrid switching method of a spindle motor of an optical disc drive as claimed in claim 7, wherein if said optical disc drive has reached the second switch point, the method further comprises the step of driving said spindle motor by CAV, and if said disc drive has not reached the second switch point, the method further comprises the step of driving said spindle motor by the hybrid switch write/read mode.

9. The hybrid switching method of a spindle motor of an optical disc drive as claimed in claim 6, wherein if the result of the step of detecting the speed of said spindle motor so as to judge whether said optical disc drive has reached the first switch point is no, the method further comprises the step of driving said spindle motor by CAV mode.

10. The hybrid switching method of a spindle motor of an optical disc drive as claimed in claim 6, wherein the first switch point and the second switch point are calculated by the formula as below:

$$\text{SYNC\_DIV\_MAX(MIN)} = \frac{T_{rev}}{T_{sync}} = \frac{F_{sync} \times 2\pi R}{v} = \text{SYNC\_DIV} \times \text{pole}$$

wherein the SYNC_DIV_MAX indicates said first switch point, the SYNC_DIV_MIN indicates said second switch point, the Fsync is the sync frequency of eight to fourteen modulation (EFM sync) which is the sync frequency of the disc data signal, the Trev is the period of a disc rotating one cycle, the Tsync is the reciprocal of Fsync, the v is the line speed while the optical disc drive is operated in the single-speed, the R is the radius of disc, the pole is the quantity of Hall sensor of said spindle motor, and the SYNC_DIV is the quantity of the sync signal for the disc rotating one cycle.

11. The hybrid switching method of a spindle motor of an optical disc drive as claimed in claim 10, wherein said Fsync is 7.35K for CD and is 17.6K for DVD.

12. The hybrid switching method of a spindle motor of an optical disc drive as claimed in claim 10, wherein said v is 1.2~1.4 m/s for CD and is 3.46~3.87 m/s for DVD.

13. The hybrid switching method of a spindle motor of an optical disc drive as claimed in claim 10, wherein said SYNC_DIV is calculated by the formula as below:

$$\text{SYNC\_DIV} = \frac{T_{FG}}{T_{SYNC}} = \frac{F_{SYNC} \times 2\pi R}{v \times \text{pole}} = \frac{R}{v \times \text{pole}} \times N$$

wherein the $T_{FG}$ is the cycle of the feedback signal of a disc, and N is a natural number.

14. The hybrid switching method of a spindle motor of an optical disc drive as claimed in claim 13, wherein N is 46181 for a CD and is 110584 for a DVD.

15. The hybrid switching method of a spindle motor of an optical disc drive as claimed in claim 6, wherein the first switch point and the second switch point are calculated by the formula as below:

$$\text{SYNC\_DIV\_MAX(MIN)} = \frac{T_{\text{fix-interval}}}{T_{sync}} = \frac{(2.0625 \text{ k/Interval})^{-1}}{F_{sync}^{-1}} = 3.5636 * spd * \text{Interval}$$

wherein the SYNC_DIV_MAX indicates said first switch point, the SYNC_DIV_MIN indicates said second switch point, the Tfix-internal is a fixed period defined by a user, the Fsync is the sync frequency of eight to fourteen modulation (EFM sync) which is the sync frequency of the disc data signal, the Trev is the period of a disc rotating one cycle, the Tsync is the reciprocal of Fsync, the Interval is period for detecting (sampling rate cycle is 496ms), and the spd is a target rotate speed after passing the switch point.

16. The hybrid switching method of a spindle motor of an optical disc drive as claimed in claim 15, wherein said SYNC_DIV is calculated by the formula as below:

$$\text{SYNC\_DIV} = \frac{T_{target}}{T_{sync}} = \frac{(\text{Target value})/(\text{fg\_clk})}{(F_{sync} * spd)^{-1}}$$

wherein the target is disc target, the fg_clk is FG signal counting clock of the disc, the Target Value is the quantity of the feedback signal period disc, the Fsync is the sync frequency of eight to fourteen modulation (EFM sync) which is the sync frequency of the disc data signal, the Trev is the period of a disc rotating one cycle , the Tsync is the reciprocal of Fsync, the fg_clk is clock of the feedback signal of the motor, the feedback signal clock of the motor is calculated as follows 7.1615Khz*speed*pole as the speed of said optical disc drive is 1,2,4,8,16 or 32 multiple, the feedback signal clock of the motor is calculated as follows 6.3657Khz*speed*pole as the speed of said optical disc drive is 12 or 24 multiple, and the spd is the target rotate speed after passing the switch point.

17. A hybrid switching method of a spindle motor of an optical disc drive, comprising the steps of:
providing a first switch point and a second switch point for switching said spindle motor driven selectively by two different write/read modes, wherein the first switch point and the second switch point are separated;
analyzing a position status of said optical disc drive;
wherein the disc position status of said optical disc drive is from inside to outside or from outside to inside;
according to the position status of said optical disc drive determining a switch point from the first switch point and the second switch point; and
determining a write/read mode from said two write/read modes in accordance with the determined switch point;
wherein while the position status is from outside to inside, the second switch point is determined.

* * * * *